Oct. 28, 1924.
H. M. PFLAGER
1,513,347
MOTOR TRUCK
Filed June 17, 1922      2 Sheets-Sheet 2
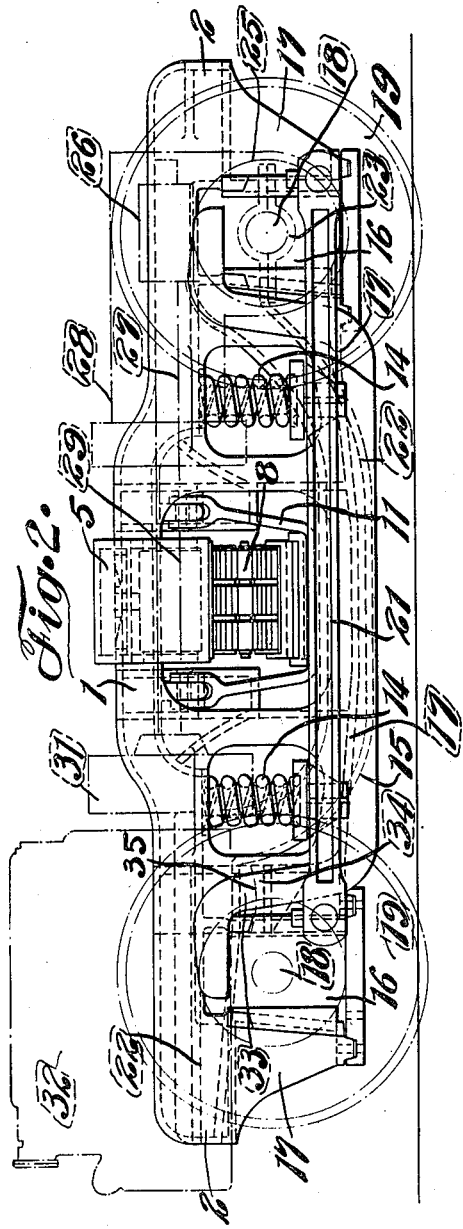
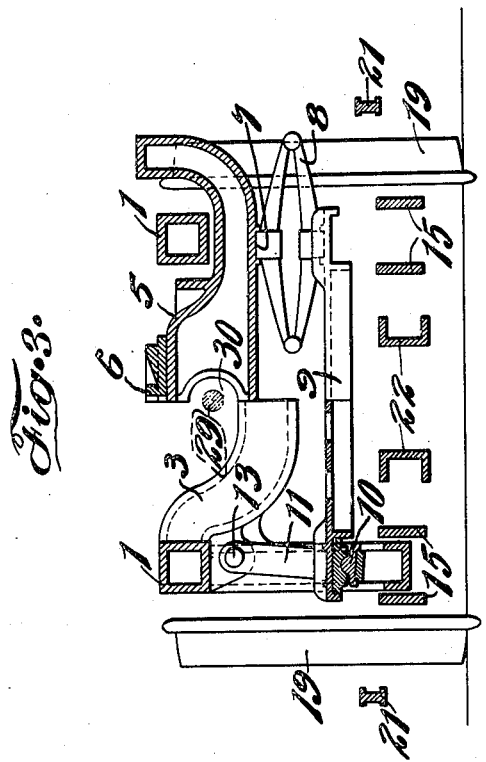
INVENTOR
HARRY M. PFLAGER.
ATTORNEY Patented Oct. 28, 1924.

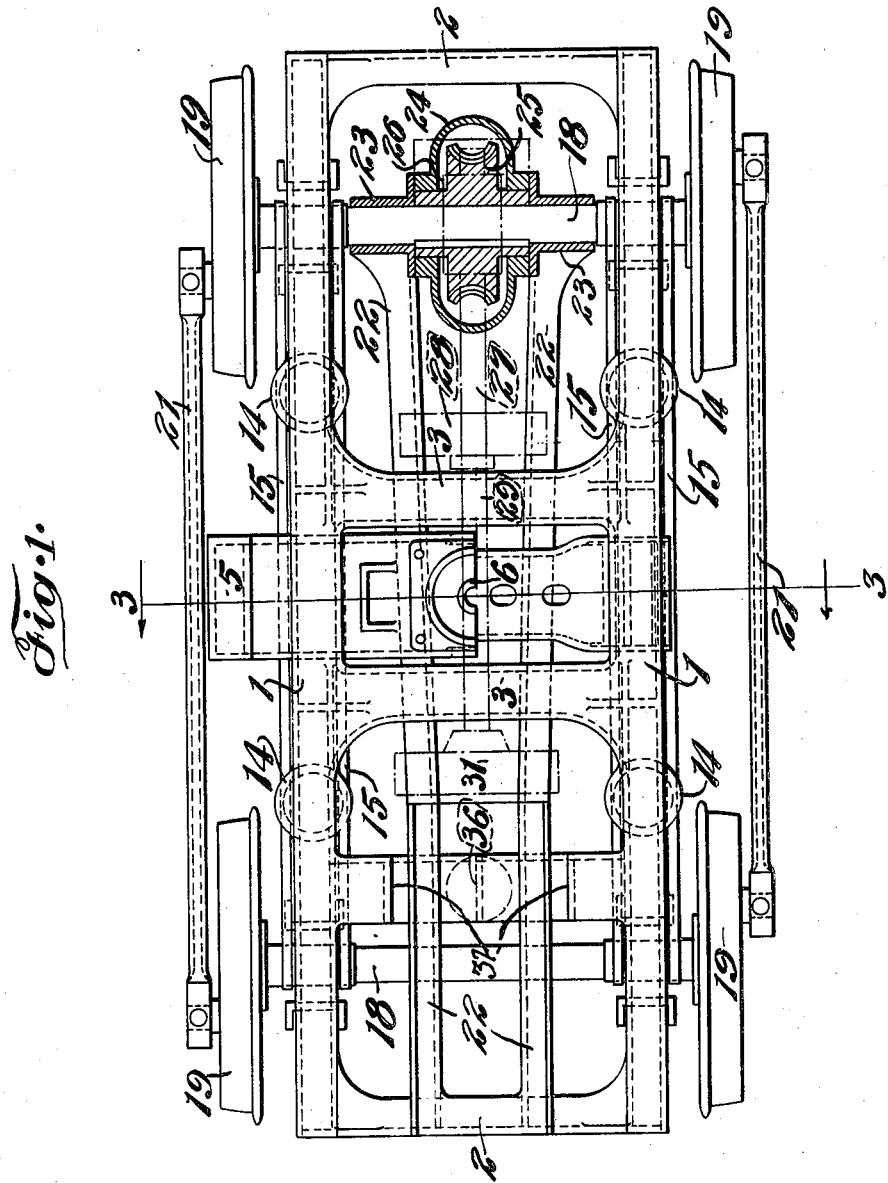

1,513,347

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

MOTOR TRUCK.

Application filed June 17, 1922. Serial No. 569,146.

*To all whom it may concern:*

Be it known that I, HARRY M. PFLAGER, a citizen of the United States, residing at the city of St. Louis and State of Missouri, have invented a certain new and useful Improvement in Motor Trucks, of which the following is a full, clear, and exact description, such as will enable others skilled in the art to which it appertains to make and use the same, reference being had to the accompanying drawings, forming part of this application, in which,—

Figure 1 is a top plan view of my improved motor truck with parts removed for clearer illustration.

Figure 2 is a side elevational view of my improved truck.

Figure 3 is a sectional view on line 3—3 of Figure 1, the spring plank being shown in elevation on the righthand side and the bolster being removed on the lefthand side.

This invention relates to a new and useful improvement in motor trucks of the type disclosed in a companion application filed by me of even date herewith, Serial No. 569,142, the object of this present invention being to construct a motor truck frame and engine mount of cast steel, the latter having a three-point support, i. e., two bearings on the driver axle and one bearing on the truck frame, so that the engine mount is free to rise and fall at its axle end and to rotate about a longitudinal center, and to accommodate itself to the movements of the driver axle.

In the particular type of truck shown, the axle bearings are located outside of the wheels, the axles extending through the journal boxes and having cranks on their outer ends connected on each side of the truck connecting rods. The truck is equipped with a conventional type of internal combustion engine with the usual friction clutch and selective gear shift, whereby one axle is driven, and by the connecting rods the other axle is likewise driven. The type of motor employed may be of any commercial type, and preferably is capable of developing from three to six hundred horsepower, depending upon the grades encountered and the load to be hauled.

In practice, there is usually a truck under each end of the car, and each of these trucks may be motor-equipped with controlling means therefor extending through the platform of the car and into a vestibule or cab located at the end or ends of the car. Each car thus becomes a self-contained motor driven unit and may be employed on side, branch and tap lines, as they are sometimes called, in hauling or delivering freight to the main lines. Being of standard gauge and having standard equipment, such a motor car can be coupled to a train on the main line for a long haul. The motor car, of course, will take care of the shorter hauls, and by replenishing the liquid fuel, may make hauls of greater or less distance.

I have illustrated an internal combustion engine as a form of motive power used, but it is obvious that other types of motors could be employed. Where the road is electrified, electric motors could be used.

In the drawings, the truck frame is shown as being made of a single casting, preferably steel, in which 1 indicates the side members, 2 the end members and 3 the transom members. The side and transom members are preferably box-shaped in cross-section, while the end members are substantially channel-shaped, said end and transom members being provided with perforated lugs for the attachment of the brake rigging.

5 indicates the bolster having the usual center bearing 6, said bolster having spring seats 7 near each end resting upon springs 8, shown in this instance as elliptic springs. Springs 8 rest upon spring plank 9, which is in turn supported by the cross-member 10 of supporting link 11. These supporting links are pivotally connected to lugs extending from the underside of transoms 3 by means of pins 13 and the ends of said pins rest in bearings depending from the transoms 3.

14 indicates frame supporting springs resting upon spaced equalizer bars 15, the ends of said bars being gooseneck in shape and supported by the journal boxes 16. These journal boxes are arranged between pedestal jaws 17 extending downwardly from the side frame members 1 and preferably the equalizer bars 15 are arranged on each side of the pedestal jaws.

18 indicates the wheel axles and 19 the wheels. The axle 18 extends through the journal box, whereby the wheels 19 are mounted on its ends, said wheels directly carrying crank pins upon which the connecting rod 21 is mounted.

22 indicates a frame member having bearings 23 at one end for receiving one of the axles 18. These bearing members are spaced apart by means of a gear casing 24, said gear casing enclosing a worm gear 25 splined to axle 18. 26 indicates a worm (see dotted lines, Figure 1) for driving gear 25, said worm being mounted on a shaft 27 having a bearing in casing 28 which houses the transmission gear. 29 is the motor driven shaft for the transmission, which shaft (see Figure 3) passes through an opening 30 in the bolster 5 and over the depressed portions of transoms 3, whereby said shaft, transoms and bolster are free to move independently of each other. Shaft 29 may carry a balance wheel 31.

32 indicates an engine casing having a battery of cylinders and its usual parts. This engine casing rests upon and is supported by the end of frame 22, and, preferably, immediately over one of the axles 18. Frame 22 is provided with a cross-member 33 having a rocker bearing 34 on its lower face, which rocker bearing cooperates with a rocker seat 35 on a cross-member 36 bridging the side members 1, before mentioned.

The ends of cross member 36 are flush with the upper faces of sides 1 but the member is depressed between its ends to form opposing shoulders 37 and the support for motor frame 22 between shoulders 37. Shoulders 37 form limit stops preventing accidental displacement of the motor frame when the truck is traveling at high speed around a curve. Furthermore, the rocking bearing readily accommodates the tilting movement of the axle on which the frame 22 is mounted, as well as permitting an independent tilting movement of the truck side frames. The axle 18 on which the frame 22 is mounted may also swing horizontally to the extent of the play allowed by its associate parts, without disturbing the alinement and proper mesh between the motor, transmission gear and the main driving gear for the axle.

The type of truck shown in this application contemplates a cast steel frame arranged between the wheels, whereby the connecting rods may be mounted on pins supported directly by the truck wheels, thus dispensing with the use of the counterweighted cranks on the ends of axles, as shown in the companion application aforesaid.

In this construction, it will be noted that the cross-member 33 of frame member 22, which carries the rocker bearing is located at a point between the axles, and, therefore, the cross-member carrying the rocker seat 35, is likewise located between the axles. This arrangement places the weight of the motor frame and its load beyond the rocker bearing 34–35, so that the frame 22 is thus counterbalanced on its rocker seat and provides, in effect, a cantilever construction.

What I claim is:

1. In combination with a truck frame, its wheels and axles, a motor supporting frame pivotally mounted on one of said axles and extending over and beyond the other axle, and a rocker bearing support on the truck frame between the axles for supporting the free end of said motor supporting frame.

2. A truck frame consisting of a steel casting having side, end and transom members, and a cross member between an end and a transom member, said cross member having opposing shoulders for limiting the transverse movement of a member mounted on said cross member.

3. A truck frame having side, end and transom members, pedestal jaws and boxes, axles mounted in said boxes, a motor supporting frame having a bearing on one axle and extending beyond the other axle and being supported by said truck frame at a point between the axles.

4. In combination with a truck frame including side pieces, wheels and axles, a bolster extending between said truck side pieces, a motor supporting frame pivotally mounted on an axle to one side of said bolster, said motor frame being supported by said truck frame on the opposite side of said bolster and between the axles.

5. In combination with a truck frame, its wheels and axles, a motor supporting frame pivotally mounted on one of said axles and extending over and beyond the other axle, and a rocker bearing support on the truck frame between the axles for supporting said motor frame.

6. In combination with a truck frame, its wheels and axles, a center bearing, a motor supporting frame pivotally mounted on one of said axles and extending beyond said center bearing, and a rocker bearing on the truck frame between the axles for the bottom of the extended end of said motor frame.

7. In combination with a truck frame, its wheels and axles, a motor supporting frame having a two-point bearing on one of said axles, said frame bridging the space between said axles and having a bearing on said truck frame between the axles.

8. In combination with a truck frame, its wheels and axles, a motor supporting frame having a bifurcated end bearing on one of said axles, a gear casing on said axle within said bifurcation, said frame extending beyond the other axle and at its opposite end having a rocker bearing engagement with said truck frame between the axles, a motor mounted on said motor frame, and a motor driven shaft operated by said motor and extending into said gear casing.

9. In combination with a truck frame, its wheels and axles, a motor supporting frame pivotally mounted on one of said axles, and extending over and beyond the other axle, a bearing on the truck frame between the axles for said extended end, a motor mounted on said extended end, and a motor driven shaft extending from the motor to the axle on which said frame is pivoted.

10. In combination with a truck frame, its wheels and axles, a motor supporting frame pivotally mounted on one of said axles and extending over and beyond the other axle, a bearing on the truck frame between the axles for said extended end, a motor mounted on said extended end, and a motor driven shaft extending from said motor to the axle on which said frame is pivoted, said truck frame being provided with depressed portions over which said motor driven shaft freely passes.

11. In a truck, wheeled axles, a motor frame secured at one end to one of said axles and carrying a motor on its other end, and a fixed support for said motor frame between its ends which permits said motor frame to oscillate thereon.

12. In a truck, a truck frame, wheeled axles, a motor frame secured at one end to one of said axles and carrying a motor on its other end, and a fixed support on said truck frame for said motor frame between the ends of the latter.

In testimony whereof I hereunto affix my signature this 12th day of June, 1922.

HARRY M. PFLAGER.